US012720314B2

(12) United States Patent
Choyi et al.

(10) Patent No.: US 12,720,314 B2
(45) Date of Patent: Aug. 25, 2026

(54) SYSTEMS AND METHODS FOR SECURE TRANSPORT AND PROCESSING OF DATA IN FEDERATED LEARNING

(71) Applicant: Verizon Patent and Licensing Inc., Basking Ridge, NJ (US)

(72) Inventors: Vinod Kumar Choyi, Conshohocken, PA (US); Timothy E. Coyle, Chicopee, MA (US); Hector Alejandro Garcia Crespo, N Richland Hills, TX (US); Ammara Essa, Los Angeles, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 288 days.

(21) Appl. No.: 18/651,912

(22) Filed: May 1, 2024

(65) Prior Publication Data

US 2025/0344064 A1 Nov. 6, 2025

(51) Int. Cl.

| | |
|---|---|
| ***H04W 12/102*** | (2021.01) |
| ***H04W 12/02*** | (2009.01) |
| ***H04W 12/03*** | (2021.01) |
| ***H04W 12/069*** | (2021.01) |
| ***H04W 24/02*** | (2009.01) |

(52) U.S. Cl.

CPC ......... *H04W 12/102* (2021.01); *H04W 12/02* (2013.01); *H04W 12/03* (2021.01); *H04W 12/069* (2021.01); *H04W 24/02* (2013.01)

(58) Field of Classification Search

CPC ... H04W 12/02; H04W 12/03; H04W 12/069; H04W 12/102; H04W 24/02

See application file for complete search history.

(56) References Cited

U.S. PATENT DOCUMENTS

| | | | | |
|---|---|---|---|---|
| 11,588,798 | B1 * | 2/2023 | Cline | H04L 63/0272 |
| 2019/0044918 | A1 * | 2/2019 | Doshi | G06F 21/14 |
| 2020/0145419 | A1 * | 5/2020 | Yitbarek | H04L 63/0853 |
| 2020/0259896 | A1 * | 8/2020 | Sachs | H04L 63/0428 |
| 2023/0054446 | A1 * | 2/2023 | LaFever | H04W 12/75 |
| 2023/0095651 | A1 * | 3/2023 | Balasubramanian | H04W 12/03 380/270 |
| 2023/0199489 | A1 * | 6/2023 | Austin | H04L 9/3215 713/168 |
| 2024/0146715 | A1 * | 5/2024 | Ponnuru | H04L 9/08 |
| 2024/0235823 | A1 * | 7/2024 | Kim | H04L 63/0428 |
| 2025/0220471 | A1 * | 7/2025 | Li | H04W 36/0083 |

* cited by examiner

*Primary Examiner* — Amy R Hsu

(57) ABSTRACT

In some implementations, a first UE may identify a configuration that includes artificial intelligence or machine learning (AI/ML) model parameters to be used and shared for federated learning. The first UE may generate an AI/ML model based on the configuration, wherein the AI/ML model is based on an anonymization and encryption of one or more information elements (IEs) using policy information. The first UE may secure the AI/ML model. The first UE may establish a circle-of-trust to include the first UE and a second UE. The first UE may transmit the AI/ML model to the second UE based on the second UE being included in the circle-of-trust.

20 Claims, 4 Drawing Sheets

SYSTEMS AND METHODS FOR SECURE TRANSPORT AND PROCESSING OF DATA IN FEDERATED LEARNING

BACKGROUND

Communication systems are widely deployed to provide various telecommunication services such as telephony, video, data, messaging, and broadcasts. A network may include one or more network nodes that support communication for wireless communication devices.

DETAILED DESCRIPTION OF EXAMPLE EMBODIMENTS

Figure 1:
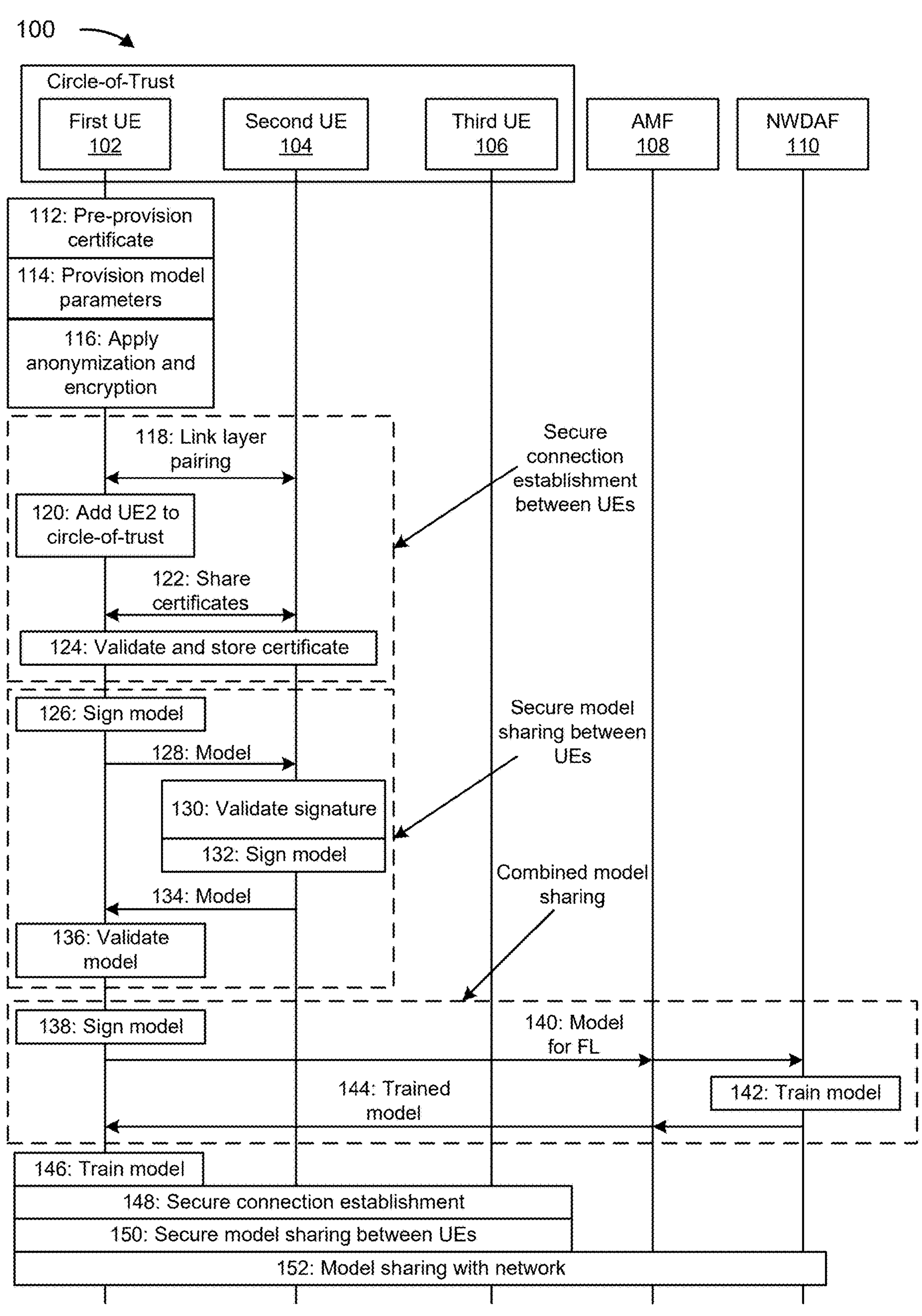
FIG. 1 is a diagram of sharing models based on federated learning.

The following detailed description of example implementations refers to the accompanying drawings. The same reference numbers in different drawings may identify the same or similar elements.

A user may be associated with a primary user equipment (UE) (e.g., a smart phone with a Fifth Generation (5G) subscription) and a secondary UE (e.g., a smart watch, an augmented reality (AR) or virtual reality (VR) headset, or a vehicle). The primary UE and the secondary UE may be part of a circle-of-trust associated with the user. The secondary UE may also be associated with a family member of the user (e.g., a dependent child).

A network entity may communicate attack scenarios (e.g., zero-day attack scenarios) to a UE. The network entity may generate artificial intelligence and/or machine learning (AI/ML) models and use global training data to train the AI/ML models, where the AI/ML models may be used to predict potential attacks to the UE. The AI/ML models may be generated by the network entity and shared with the UE in order to improve performance (e.g., optimized 5G connections or security). By using AI/ML models with the capability of prediction, attacks may be thwarted based on the periodic transfer of knowledge (e.g., the AI/ML models) from the network entity to the UEs. The periodic transfer of knowledge may allow the AI/ML models to adapt to changes in threat actors, newer attack vectors, and newly discovered vulnerabilities.

In a network-centric view of such prediction, the AI/ML models may have limited usefulness or accuracy because of the diversity of UEs. In addition, because of privacy concerns, certain private data and connection information, such as Bluetooth network connections may not be shared with the network entity whereas this data could be particularly useful in increasing the utility of the AI/ML models. A prediction and AI/ML model accuracy may be reduced as the diversity of UEs (e.g., secondary UEs) increases, in combination with the limitation of data from the UEs.

In existing federated learning approach, an AI/ML model may be tailored to the characteristics of the UE, thus making the predictions more accurate. The UE may use a global model received from the network entity as a baseline, and then the UE may use local data (e.g., the UE's own local data) to train the AI/ML model in order to generate a local AI/ML model that is more tailored and accurate for the UE's local surroundings. Since each UE may have its own unique characteristics and capabilities (e.g., memory, processing capability, and/or network connections (e.g., Bluetooth)), using a tailored local AI/ML model may become more useful. The local AI/ML model may be used by the UE to create policies (e.g., security policies) in order to perform collaborative firewalling, filter calls (e.g., robocalls), and/or identify malicious data.

In order to maintain the privacy of UE data, the UE may not send privacy related data to the network entity (e.g., a 5G network data analytics function (NWDAF)). In some cases, some UE/user data may be sent to the network component, but the UE/user data may be in an encrypted form. Generic platform information may be shared with the network component, but certain application-specific data may be used only within the local AI/ML model. However, in existing federated learning models, no mechanisms are defined for identifying which data is to be sent to network components, and/or securely transporting and processing data (e.g., analytics data) between the UE and the network entity in a federated learning architecture. Further, existing federated learning architectures may not consider federation beyond a primary UE. Further, federated learning architectures do not consider secondary UEs connected to the primary UE.

In some implementations, a primary UE may use pre-provisioned cryptographic data (including crypto-suites) and/or protection profiles (e.g., data and information elements (IEs) to be protected) in order to maintain the privacy and confidentiality associated with a user of the UE in a highly federated learning architecture. The primary UE may create a circle-of-trust with one or more secondary UEs and one or more tertiary UEs. Security credentials may be exchanged that are to be used for securing an AI/ML model and associated data. The primary UE may establish a data policy, e.g., identify data that is not to be sent, data that is to be encrypted and sent, and unencrypted data that is to be sent (e.g., data including model parameters and/or raw data). A flag may be used to indicate whether or not federated learning is to be used. The primary UE may generate security objects that provide relevant protection and send secured data to a network entity, such as an NWDAF. The primary UE may collect data from secondary UEs, and the primary UE may send the data to the network entity. The primary UE may digitally sign the data using a private key associated with the primary UE and use pre-provisioned certificates and/or certificate chains to communicate the AI/ML models and data in a secure manner with the network entity.

In some implementations, the network entity may validate a signature from the UE and normalize collected data from the UE. The network entity may generate training results (e.g., AI/ML model parameters) based on the collected data, where the training results may be appropriate for the UE. The network entity may digitally sign the training results and send the training results to the UE. The UE may validate the signature and process the training results to form a UE-specific AI/ML model. The UE may send the UE-specific AI/ML model and associated parameters securely using credentials generated as part of a circle-of-trust establishment.

In some implementations, the UE, which may be the primary UE, may be selected as a trust anchor for the secondary UEs. The UE may be provided with a capability to establish the circle-of-trust that includes the one or more secondary UEs and the one or more tertiary UEs. The UE may be provided with a capability to secure the UE-specific AI/ML model using security objects (e.g., JavaScript Object Notation (JSON) web encryption and/or JSON web tokens) that can provide encryption, authentication, and/or integrity to the AI/ML models. The capabilities provided to the UEs may include security functionalities, such as certificate management (e.g., Certificate Management Protocol (CMPv2)), cryptographic capabilities (e.g., encryption using Advanced Encryption Standard (AES-256)), integrity and authenticity using a Keyed Hash Message Authentication Code (e.g., HMAC-SHA256), and/or privacy enhancing cryptographic techniques. The privacy enhancing cryptographic techniques may include secure multiparty computation (SMPC) algorithms, and/or fully-homomorphic encryption (FHE), including digital certificate chains associated with a mobile operator network (e.g., NWDAF certificates), and/or other cryptographic capabilities. The UE may choose to use asymmetric cryptography based on public key mechanisms and rely on pre-provisioned certificate chains and/or symmetric cryptography based on pre-shared keys. The symmetric cryptography may be based on a derivative key that is generated from a pre-shared key. The pre-shared key may be a key 'K' that has been provisioned into a universal subscriber identity module (USIM) card or universal integrated circuit card (UICC) by a network operator. An example of a derivative key may be an application key ($K_{AF}$) generated as part of an authentication and key management for applications (AKMA), which may generate an AKMA key (KAKMA) from a key generated by an authentication server function (AUSF) after a mobile primary authentication process. A primary authentication process may be based on a 5G authentication and key agreement (AKA) process, an extensible authentication protocol (EAP) AKA process, or any other similar process. The UE may be provided with a capability to identify AI/ML model parameters and determine which of the data is to be encrypted, a type of cryptography (e.g., homomorphic versus AES), and/or which of the data is to be sent in clear text to the network entity.

In some implementations, after securing the data and/or the AI/ML model, parameters may be shared with the network entity. The data and/or the model parameters shared by the UE may be indistinguishable from data or AI/ML model/parameters shared by individual UEs that form the circle of trust. The UE may share data to the network entity that does not reveal individual components of the circle of trust. The UE-specific AI/ML model may include a personalized data sharing configuration. As a result, the AI/ML model used by the UE may be tailored to characteristics of the UE, thus making predictions provided by the AI/ML model more accurate, as compared to when the AI/ML model does not consider characteristics of the UE.

FIG. 1 is a diagram of an example 100 associated with sharing models based on federated learning. As shown in FIG. 1, example 100 includes a plurality of UEs, such as a first UE 102 (e.g., a primary UE), a second UE 104 (e.g., a first secondary UE), and a third UE 106 (e.g., a second secondary UE), an access and mobility management function (AMF) 108, and an NWDAF 110. The first UE 102, the second UE 104, and the third UE 106 may be associated with a circle-of-trust, where the circle-of-trust may be in terms of cybersecurity. The circle-of-trust may be a collection of trusted UEs capable of providing AI/ML model updates.

As shown by reference number 112, the first UE 102 may be pre-provisioned with an identity (e.g., fully qualified domain name (FQDN)) associated with the NWDAF, NWDAF certificate, and/or certificate chains during a service activation. As shown by reference number 114, the first UE 102 may be provisioned with AI/ML model parameters and labels that are to be used and shared for federated learning. In federated learning, an AI/ML model may be trained locally, and only AI/ML model updates may be shared, which may allow for maintaining privacy and allowing for collaborative learning without sharing raw data. As shown by reference number 116, the first UE 102 may apply anonymization and encryption of IEs based on policies, and the first UE 102 may train an AI/ML model based on the provisioning of the AI/ML model parameters and labels.

In some implementations, in a pre-configuration or provisioning phase, the first UE 102 may be configured with a type of data (e.g., identifiers and/or application identifiers) that are to be anonymized. The first UE 102 may be configured with a type of cryptography (e.g., multi-party computation, differential privacy, or homomorphic encryption) that is to be used. The first UE 102 may be provisioned with cryptography and protocol requirements. The first UE 102 may be configured with trust anchor certificate chains. The first UE 102 may be configured with a flag that indicates whether federated learning is to be used. When the flag is set (e.g., when the flag is set to ON), an endpoint for sending the AI/ML model may be configured. The first UE 102 may be configured with a level of hierarchy of federated learning. The level of hierarchy of federated learning may define secondary UEs and/or tertiary UEs that are associated with the first UE 102.

As shown by reference number 118, as part of a secure connection establishment between UEs, the first UE 102 and the second UE 104 may perform a link layer pairing. As shown by reference number 120, the first UE 102 may add the second UE 104 into the circle-of-trust. As shown by reference number 122, the first UE 102 and the second UE 104 may share certificates that contain the respective UE's public key/signing key. As shown by reference number 124, the first UE 102 and the second UE 104 may validate and store certificates, respectively.

As shown by reference number 126, as part of a secure AI/ML model sharing between UEs, the first UE 102 may digitally sign the AI/ML model. As shown by reference number 128, the first UE 102 may send, to the second UE 104, the AI/ML model that is digitally signed using the first UE's private key and optional secondary attributes (e.g., trusted certificate chains and other UE certificates). As shown by reference number 130, the second UE 104 may validate the signature and apply anonymization and encryption of IEs based on policies, and the second UE 104 may train the AI/ML model using local data. The local data may refer to data that is not transmitted outside of the second UE 104. As shown by reference number 132, the second UE 104 may digitally sign the AI/ML model. As shown by reference number 134, the second UE 104 may send, to the first UE 102, the AI/ML model that is digitally signed using the second UE's private key. As shown by reference number 136, the first UE 102 may validate the AI/ML model for integrity and authenticity.

As shown by reference number 138, as part of a sharing of a combined AI/ML model with a network, the first UE 102 may apply anonymization and encryption of relevant IEs based on policies. The first UE 102 may sign the AI/ML model (e.g., the AI/ML model received from the second UE 104). The first UE 102 may share its certificate. As shown by reference number 140, the first UE 102 may send the AI/ML model to the NWDAF 110 via the AMF 108, where the first UE 102 may send the AI/ML model for federated learning. As shown by reference number 142, the NWDAF 110 may use federated learning to train the AI/ML model. As shown by reference number 144, the NWDAF 110 may send the newly trained AI/ML model to the first UE 102.

As shown by reference number 146, the first UE 102 may perform a training with the AI/ML model and generate federated learning components for each UE, such as the second UE 104 and the third UE 106. As shown by reference number 148, the first UE 102 may perform a secure connection establishment with the third UE 106. As shown by reference number 150, the first UE 102 may perform a secure AI/ML model sharing with the third UE 106. As shown by reference number 152, the first UE 102 may share a resulting AI/ML model with the network.

In some implementations, the first UE 102 may perform a training result set preparation. The first UE 102 may only send certain raw data to the network or a centralized server. The first UE 102 may identify data that is to be protected and not shared with the network. The first UE 102 may apply encryption to the identified data and/or IEs. The first UE 102 may digitally sign training results and encrypted data, as well as optional raw data, and send such information to the NWDAF 110. During an AI/ML model generation by the network, the NWDAF 110 may validate the signature and freshness associated with the training results, which may serve to validate the integrity of the training results. The NWDAF 110 may use data that has both the encrypted, as well as un-encrypted data, for processing. The primary UE may optionally indicate which data has been encrypted and which data has not been encrypted. Some of the encrypted data may be decrypted by the NWDAF 110 using either keys that are generated from a key establishment process or using symmetric keys. Other encrypted data which has been generated using an encryption scheme (e.g., homomorphic or differential privacy encryption) may be used in AI/ML model generation without the need for decryption by the NWDAF 110. The NWDAF 110 may obtain a consolidated AI/ML model using training results from other UEs, such as the second UE 104 and the third UE 106. The NWDAF 110 may generate a digital signature to provide integrity and authenticity for a first UE-specific model. The NWDAF 110 may send, to the first UE 102, the first UE-specific model for processing at the first UE 102. During an AI/ML model consumption by the first UE 102, the first UE 102 may validate the digital signature of the first UE-specific AI/ML model, and then the first UE 102 may use the first UE-specific AI/ML model for prediction. The first UE 102 may send a second UE-specific model, to the second UE 104 and generate a digital signature using a private key and certificate associated with the first UE 102. During an AI/ML model consumption by the second UE 104, the second UE 104 may validate the digital signature of the second UE-specific AI/ML model, and then the second UE 104 may use the second UE-specific AI/ML model for prediction.

In some implementations, a feature set or sample space of different UEs may not be identical. For example, a feature set or sample space of the first UE 102 may be larger than that of the second UE 104. Data that may not be shared with the network may include UE identifiers of the second UE 104 and the third UE 106, such as subscription permanent identifiers (SUPIs) associated with the second UE 104 and the third UE 106, respectively. Such identifiers (e.g., SUPIs) may be associated with subordinate devices or secondary devices (e.g., smart watches, or AR/VR headsets). An anonymization may be performed by the second UE 104 before sending the training data to the first UE 102. The anonymization may mask the identifiers associated with the training data. Alternatively, the anonymization may be performed by the first UE 102 on behalf of the second UE 104 and the third UE 106. Encryption may or may not be performed for all data. Data may be raw device data (e.g., device identifier), encrypted data, data that provides usage information (e.g., bandwidth and/or processes used), training output, and/or training results. Some data may be more privacy sensitive as compared to other data.

In some implementations, in a federated learning setup, the NWDAF 110 may be responsible for coordinating the federated learning. For example, the first UE 102 may request an AI/ML model from the NWDAF 110. The first UE 102 may receive the AI/ML model from the NWDAF 110. The first UE 102 may authenticate or validate the AI/ML model. The first UE 102 may locally train the AI/ML model. The first UE 102 may return the AI/ML model to the NWDAF 110. The NWDAF 110 may average AI/ML models from different UEs. The NWDAF 110 may synchronize a latest AI/ML model between the different UEs (e.g., all UEs may receive the latest AI/ML model).

In some implementations, in the federated learning setup, the plurality of UEs may form the circle-of-trust without a central server. For example, the second UE 104 may request to be added to the circle-of-trust, and the first UE 102 may authenticate the request. The second UE 104 may receive, from the first UE 102, a latest AI/ML model, and the second UE 104 may authenticate and validate the latest AI/ML model. The second UE 104 may locally train the latest AI/ML model. The second UE 104 may send the locally trained model to the first UE 102 after encrypting relevant data in order that the UE 102 can tailor the data global data that accurately captures all the models received from the UEs within its circle-of-trust. After a certain period of time, the first UE 102 may signal that a new AI/ML model is available, and the first UE 102 may provide the new AI/ML model with circle-of-trust UEs including the second UE 104. The first UE 102 may alternatively generate a UE-specific model that is shared with each UEs within its circle-of-trust.

In some implementations, in the federated learning setup, UEs may subscribe as consumers of AI/ML models without being in the circle-of-trust. For example, a fourth UE may request a subscription, and the first UE 102 may authenticate the request. The fourth UE may be a subscribed UE. The fourth UE may receive a latest AI/ML model, and the fourth UE may authenticate and validate the AI/ML model. The fourth UE may locally use the AI/ML model as needed. The first UE 102 may signal a new AI/ML model availability, the fourth UE may resynchronize and obtain the new AI/ML model.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
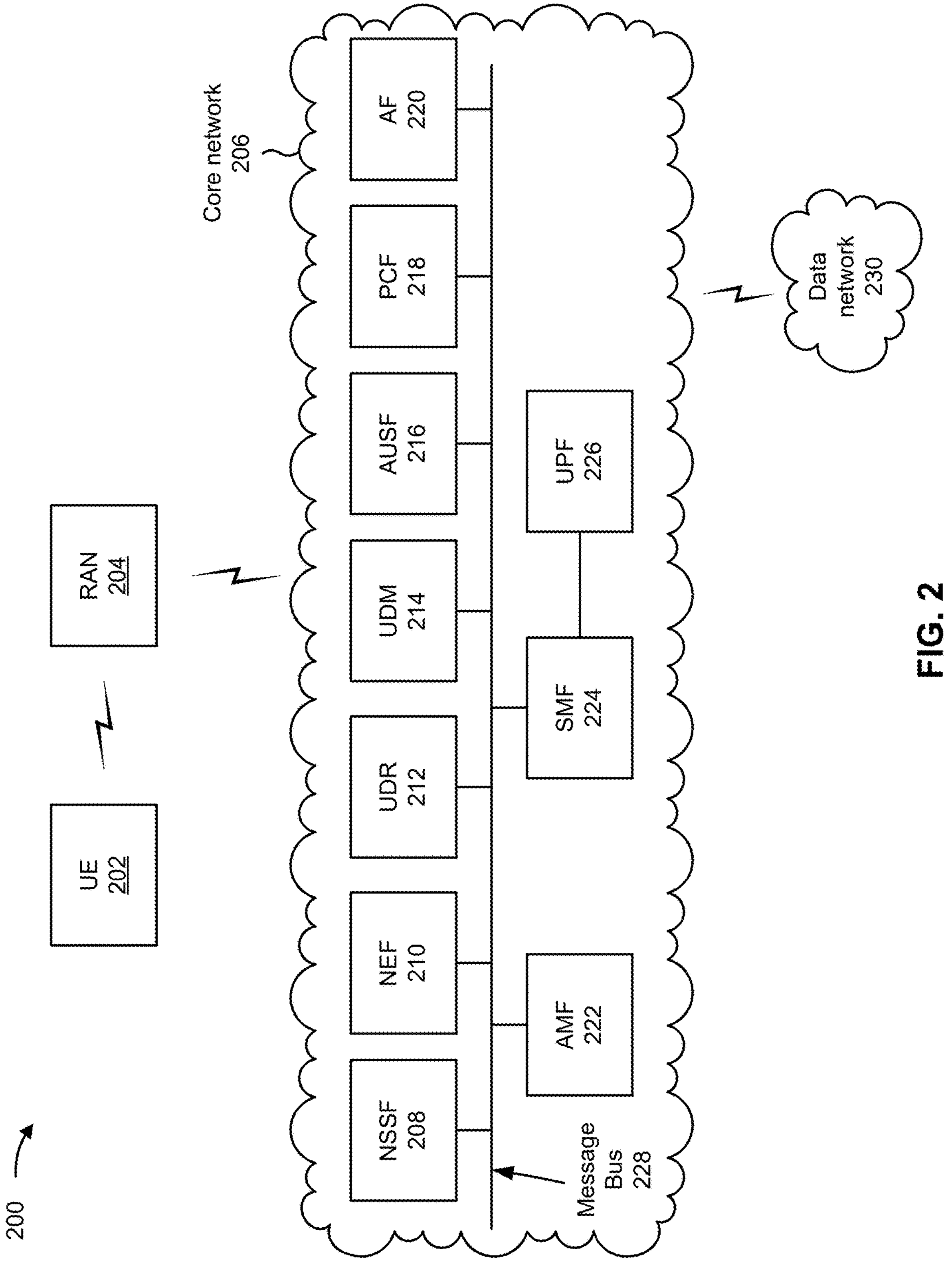
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include a UE 202, a radio access network (RAN)

204, a core network 206, and a data network 230. Devices and/or networks of example environment 200 may interconnect via wired connections, wireless connections, or a combination of wired and wireless connections.

The UE 202 may include one or more devices capable of receiving, generating, storing, processing, and/or providing information, such as information described herein. For example, the UE 202 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 204 may support, for example, a cellular radio access technology (RAT). The RAN 204 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 202. A base station may be a disaggregated base station. The disaggregated base station may be configured to utilize a protocol stack that is physically or logically distributed among two or more nodes, which may include a radio unit (RU), a distributed unit (DU), and a centralized unit (CU). The RAN 204 may transfer traffic between the UE 202 (e.g., using a cellular RAT), one or more base stations (e.g., using a wireless interface or a backhaul interface, such as a wired backhaul interface), and/or the core network 206. The RAN 204 may provide one or more cells that cover geographic areas.

In some implementations, the RAN 204 may perform scheduling and/or resource management for the UE 202 covered by the RAN 204 (e.g., the UE 202 covered by a cell provided by the RAN 204). In some implementations, the RAN 204 may be controlled or coordinated by a network controller, which may perform load balancing, network-level configuration, and/or other operations. The network controller may communicate with the RAN 204 via a wireless or wireline backhaul. In some implementations, the RAN 204 may include a network controller, a self-organizing network (SON) module or component, or a similar module or component. In other words, the RAN 204 may perform network control, scheduling, and/or network management functions (e.g., for uplink, downlink, and/or sidelink communications of the UE 202 covered by the RAN 204).

In some implementations, the core network 206 may include an example functional architecture in which systems and/or methods described herein may be implemented. For example, the core network 206 may include an example architecture of a 5G next generation (NG) core network included in a 5G wireless telecommunications system. While the example architecture of the core network 206 shown in FIG. 2 may be an example of a service-based architecture, in some implementations, the core network 206 may be implemented as a reference-point architecture, among other examples.

As shown in FIG. 2, the core network 206 may include a number of functional elements. The functional elements may include, for example, a network slice selection function (NSSF) 208, a network exposure function (NEF) 210, a unified data repository (UDR) 212, a unified data management (UDM) 214, an AUSF 216, a policy control function (PCF) 218, an application function (AF) 220, an AMF 222, a session management function (SMF) 224, and/or a user plane function (UPF) 226. These functional elements may be communicatively connected via a message bus 228. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 208 may include one or more devices that select network slice instances for the UE 202. The NSSF 208 may allow an operator to deploy multiple substantially independent end-to-end networks potentially with the same infrastructure. In some implementations, each slice may be customized for different services. The NEF 210 may include one or more devices that support exposure of capabilities and/or events in the wireless telecommunications system to help other entities in the wireless telecommunications system discover network services.

The UDR 212 may include one or more devices that provide a converged repository, which may be used by network functions to store data. For example, a converged repository of subscriber information may be used to service a number of network functions. The UDM 214 may include one or more devices to store user data and profiles in the wireless telecommunications system. The UDM 214 may generate authentication vectors, perform user identification handling, perform subscription management, and perform other various functions. The AUSF 216 may include one or more devices that act as an authentication server and support the process of authenticating the UE 202 in the wireless telecommunications system.

The PCF 218 may include one or more devices that provide a policy framework that incorporates network slicing, roaming, packet processing, and/or mobility management, among other examples. The AF 220 may include one or more devices that support application influence on traffic routing, access to the NEF 210, and/or policy control, among other examples. The AMF 222 may include one or more devices that act as a termination point for non-access stratum (NAS) signaling and/or mobility management, among other examples. The SMF 224 may include one or more devices that support the establishment, modification, and release of communication sessions in the wireless telecommunications system. For example, the SMF 224 may configure traffic steering policies at the UPF 226 and/or may enforce UE internet protocol (IP) address allocation and policies, among other examples. The UPF 226 may include one or more devices that serve as an anchor point for intra-RAT and/or inter-RAT mobility. The UPF 226 may apply rules to packets, such as rules pertaining to packet routing, traffic reporting, and/or handling user plane QoS, among other examples. The message bus 228 may represent a communication structure for communication among the functional elements. In other words, the message bus 228 may permit communication between two or more functional elements.

The data network 230 may include one or more wired and/or wireless data networks. For example, the data network 230 may include an Internet Protocol multimedia subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
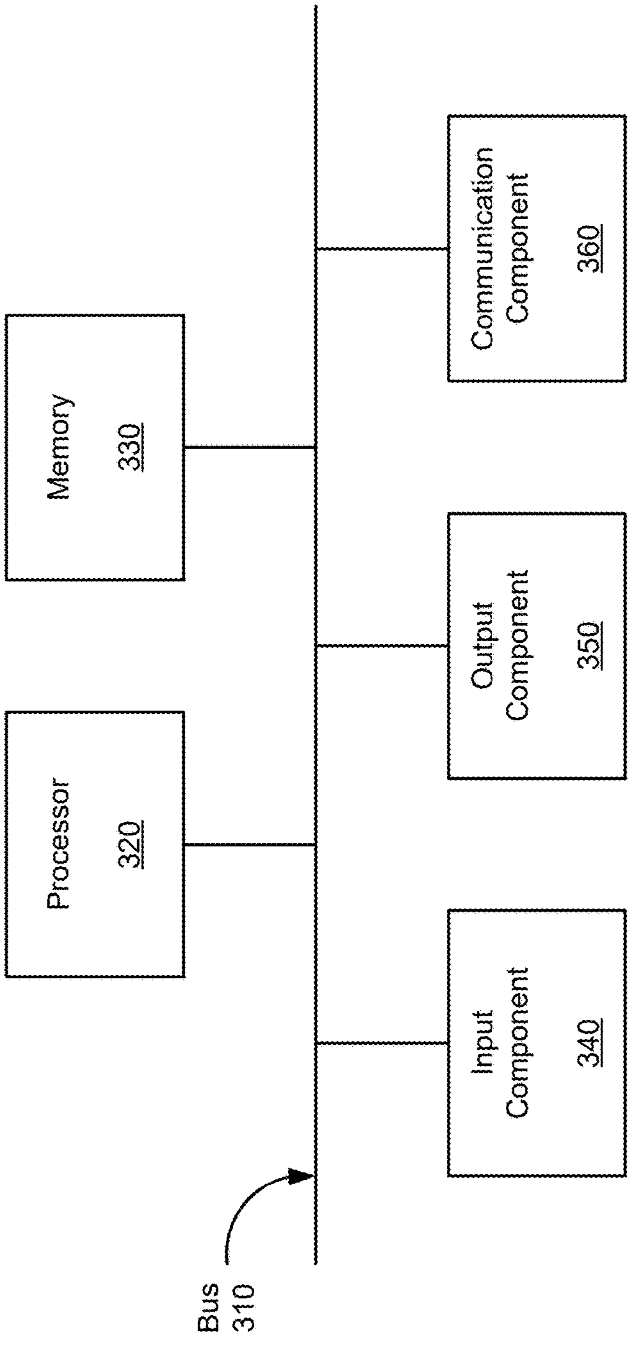
FIG. 3 is a diagram of example components of one or more devices of FIG. 2.

FIG. 3 is a diagram of example components of a device 300 associated with sharing models based on federated learning. The device 300 may correspond to a UE (e.g., UE 202). In some implementations, the UE may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
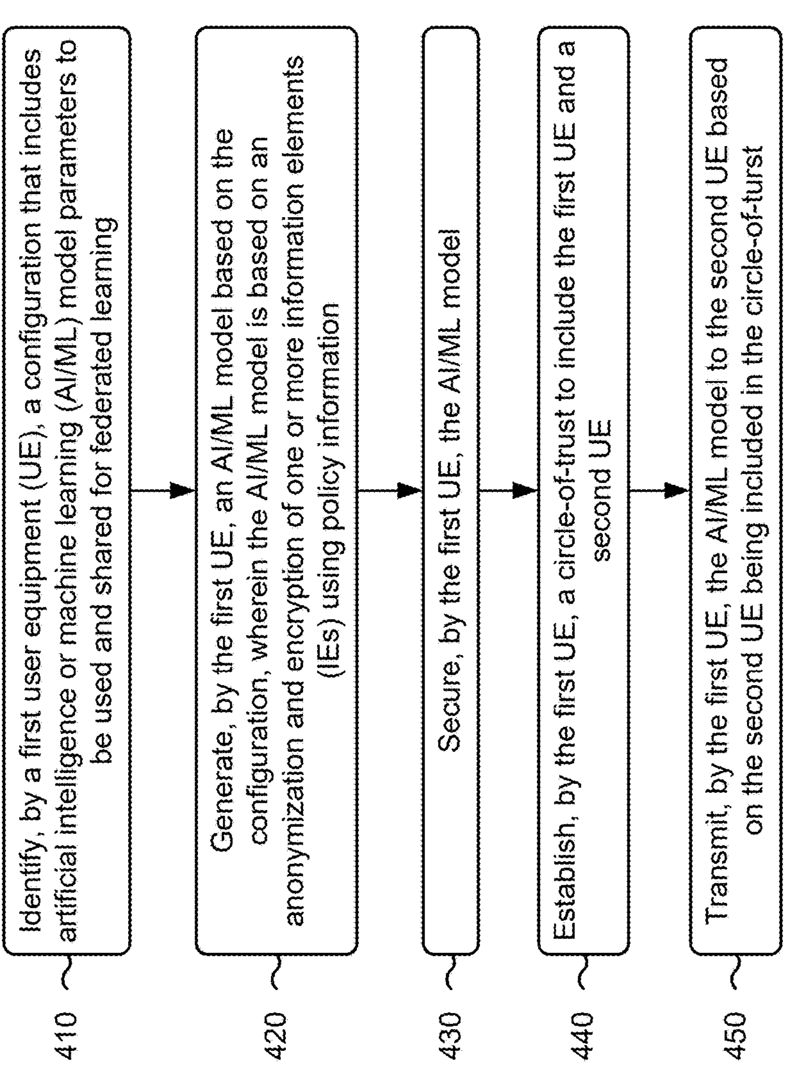
FIG. 4 is a flowchart of an example process associated with sharing models based on federated learning.

FIG. 4 is a flowchart of an example process 400 associated with sharing models based on federated learning. In some implementations, one or more process blocks of FIG. 4 may be performed by a first UE (e.g., UE 202). In some implementations, one or more process blocks of FIG. 4 may be performed by another entity or a group of entities separate from or including the first UE (e.g., RAN 204). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include identifying, by the first UE, a configuration that includes AI/ML model parameters to be used and shared for federated learning (block 410). The configuration may indicate a type of data to be anonymized, wherein the type of data includes a UE identifier or an application identifier. The configuration may indicate a type of cryptography to be used, wherein the type of cryptography includes one of: multi-party computation, differential privacy, or homomorphic encryption that generates encrypted data but may be operated upon without the need for decrypting the data. The configuration may indicate one or more certificate chains. The configuration may indicate a flag that indicates whether the federated learning is to be used.

As shown in FIG. 4, process 400 may include generating, by the first UE, an AI/ML model based on the configuration, wherein the AI/ML model is based on an anonymization and encryption of one or more IEs using policy information (block 420). The first UE may generate the AI/ML model using encrypted data and/or anonymized data, which may include the UE identifier or the application identifier.

As shown in FIG. 4, process 400 may include securing, by the first UE, the AI/ML model (block 430). The first UE, when securing the AI/ML model, may digitally sign, using the first UE's private key, one or more of: training results, encrypted data, or raw data. The AI/ML model may be secured using security objects (e.g., JSON objects that are encrypted and integrity protected using JWE or JSON Web Tokens) based on digital signatures and/or symmetric cryptography.

As shown in FIG. 4, process 400 may include establishing, by the first UE, a circle-of-trust to include the first UE and a second UE (block 440). The circle-of-trust may be in terms of cybersecurity. The circle-of-trust may be a collection of trusted UEs capable of providing AI/ML model updates to each other.

As shown in FIG. 4, process 400 may include transmitting, by the first UE, the AI/ML model to the second UE based on the second UE being included in the circle-of-trust (block 450). The first UE may transmit the AI/ML model that is secured to one or more of the second UE or a network entity. The first UE may identify a UE-specific AI/ML model (e.g., a personalized data sharing configuration) for each UE in the circle-of-trust. For example, a first UE-specific AI/ML model associated with the first UE may be different from a second UE-specific AI/ML model associated with the second UE.

In some implementations, the first UE may receive, from a third UE that is not included in the circle-of-trust, a subscription request for the AI/ML model. The first UE may authenticate the third UE based on the subscription request. The first UE may transmit the AI/ML model to the third UE.

In some implementations, the first UE may receive, from the second UE, an updated AI/ML model that is derived from the AI/ML model. The updated AI/ML model may be based on an anonymization and encryption of one or more IEs, by the second UE, using policy information. The first UE may validate the updated AI/ML model for integrity and authenticity.

In some implementations, the first UE may receive, from the network entity, an updated AI/ML model that is derived from the AI/ML model. The updated AI/ML model may be based on a federated learning based training by the network entity. The updated AI/ML model may be a consolidated AI/ML model based on AI/ML models received from a plurality of UEs. The first UE may train the updated AI/ML model using local data that is not provided to the network entity.

In some implementations, the first UE may identify data that is not to be transmitted, data that is to be encrypted and transmitted, and/or data that is to be unencrypted and transmitted. The data may include the AI/ML model parameters, raw device data, encrypted data, unencrypted data, a training output, and/or training results. Unencrypted data may refer to data that is not to be encrypted. Data that is transmitted may be used by the network entity (e.g., for analytics).

In some implementations, the first UE may identify an updated AI/ML model. The first UE may transmit, to the second UE, an indication that the updated AI/ML model is available. The first UE may receive, from the second UE, a request for the updated AI/ML. The first UE may transmit the updated AI/ML to the second UE.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

identifying, by a first user equipment (UE), a configuration that includes artificial intelligence or machine learning (AI/ML) model parameters to be used and shared for federated learning;

generating, by the first UE, an AI/ML model based on the configuration, wherein the AI/ML model is based on an anonymization and encryption of one or more information elements (IEs) using policy information;

securing, by the first UE, the AI/ML model;

establishing, by the first UE, a circle-of-trust to include the first UE and a second UE; and transmitting, by the first UE, the AI/ML model to the second UE based on the second UE being included in the circle-of-trust.

2. The method of claim 1, wherein the configuration indicates one or more of:

a type of data to be anonymized, wherein the type of data includes a UE identifier or an application identifier;

a type of cryptography to be used, wherein the type of cryptography includes one of:

multi-party computation, differential privacy, or homomorphic encryption;

one or more certificate chains; or a flag that indicates whether the federated learning is to be used.

3. The method of claim 1, further comprising:

identifying, by the first UE, a UE-specific AI/ML model for each UE in the circle-of-trust, wherein the UE-specific AI/ML model includes a personalized data sharing configuration.

4. The method of claim 1, further comprising:

receiving, by the first UE and from a third UE that is not included in the circle-of-trust, a subscription request for the AI/ML model;

authenticating, by the first UE, the third UE based on the subscription request; and transmitting, by the first UE, the AI/ML model to the third UE.

5. The method of claim 1, further comprising:

receiving, by the first UE and from a second UE, an updated AI/ML model that is derived from the AI/ML model, wherein the updated AI/ML model is based on an anonymization and encryption of one or more information elements (IEs) using policy information; and validating, by the first UE, the updated AI/ML model for integrity and authenticity.

6. The method of claim 1, further comprising:

receiving, by the first UE and from a network entity, an updated AI/ML model that is derived from the AI/ML model, wherein the updated AI/ML model is based on a federated learning based training by the network entity.

7. The method of claim 6, wherein the updated AI/ML model is a consolidated AI/ML model based on AI/ML models received from a plurality of UEs.

8. The method of claim 6, further comprising:

training, by the first UE, the updated AI/ML model using local data that is not provided to the network entity.

9. The method of claim 1, further comprising:

identifying, by the first UE, one or more of data that is not to be transmitted, data that is to be encrypted and transmitted, or data that is to be unencrypted and transmitted, wherein the data includes one or more of the AI/ML model parameters, raw device data, encrypted data, unencrypted data, a training output, or training results.

10. The method of claim 1, wherein securing the AI/ML model comprises digitally signing one or more of: training results, encrypted data, or raw data, and the AI/ML model is secured using security objects based on digital signatures and cryptography.

11. The method of claim 1, further comprising:

identifying, by the first UE, an updated AI/ML model;

transmitting, by the first UE and to a second UE, an indication that the updated AI/ML model is available;

receiving, by the first UE and from the second UE, a request for the updated AI/ML; and transmitting, by the first UE, the updated AI/ML to the second UE.

12. A first user equipment (UE), comprising:

one or more processors configured to:

identify a configuration that includes artificial intelligence or machine learning (AI/ML) model parameters to be used and shared for federated learning;

generate an AI/ML model based on the configuration, wherein the AI/ML model is based on an anonymization and encryption of one or more information elements (IEs) using policy information;

establish a circle-of-trust to include the first UE and a second UE; and transmit the AI/ML model to the second UE based on the second UE being included in the circle-of-trust.

13. The first UE of claim 12, wherein the configuration indicates one or more of:

a type of data to be anonymized, wherein the type of data includes a UE identifier or an application identifier;

a type of cryptography to be used, wherein the type of cryptography includes one of:

multi-party computation, differential privacy, or homomorphic encryption;

one or more certificate chains; or a flag that indicates whether the federated learning is to be used.

14. The first UE of claim 12, wherein the one or more processors are configured to:

identify a UE-specific AI/ML model for each UE in the circle-of-trust.

15. The first UE of claim 12, wherein the one or more processors are configured to:

receive, from a third UE that is not included in the circle-of-trust, a subscription request for the AI/ML model;

authenticate the third UE based on the subscription request; and transmit the AI/ML model to the third UE.

16. The first UE of claim 12, wherein the one or more processors are configured to:

receive, from a second UE, an updated AI/ML model that is derived from the AI/ML model, wherein the updated AI/ML model is based on an anonymization and encryption of one or more IEs using policy information; and validate the updated AI/ML model for integrity and authenticity.

17. The first UE of claim 12, wherein the one or more processors are configured to:

receive, from a network entity, an updated AI/ML model that is derived from the AI/ML model, wherein the updated AI/ML model is based on a federated learning based training by the network entity, and the updated AI/ML model is a consolidated AI/ML model based on AI/ML models received from a plurality of UEs; and train the updated AI/ML model using local data that is not provided to the network entity.

18. The first UE of claim 12, wherein the one or more processors are configured to:

identify one or more of data that is not to be transmitted, data that is to be encrypted and transmitted, or data that is to be unencrypted and transmitted, wherein the data includes one or more of the AI/ML model parameters, raw device data, encrypted data, unencrypted data, a training output, or training results; and secure the AI/ML model by digitally signing one or more of: training results, encrypted data, or raw data, and the AI/ML model is secured using security objects based on digital signatures and cryptography.

19. The first UE of claim 12, wherein the one or more processors are configured to:

identify an updated AI/ML model;

transmit, to a second UE, an indication that the updated AI/ML model is available;

receive, from the second UE, a request for the updated AI/ML; and transmit the updated AI/ML to the second UE.

20. A non-transitory computer-readable medium storing a set of instructions, the set of instructions comprising:

one or more instructions that, when executed by one or more processors of a first user equipment (UE), cause the first UE to:

identify a configuration that includes artificial intelligence or machine learning (AI/ML) model parameters to be used and shared for federated learning;

generate an AI/ML model based on the configuration, wherein the AI/ML model is based on an anonymization and encryption of one or more information elements (IEs) using policy information;

establish a circle-of-trust to include the first UE and a second UE; and transmit the AI/ML model to the second UE based on the second UE being included in the circle-of-trust.

* * * * *